Sept. 13, 1949.  H. A. NOYES  2,481,484
QUICK FREEZING OF FOODSTUFFS WITHOUT PRECOOLING
Filed Dec. 9, 1944
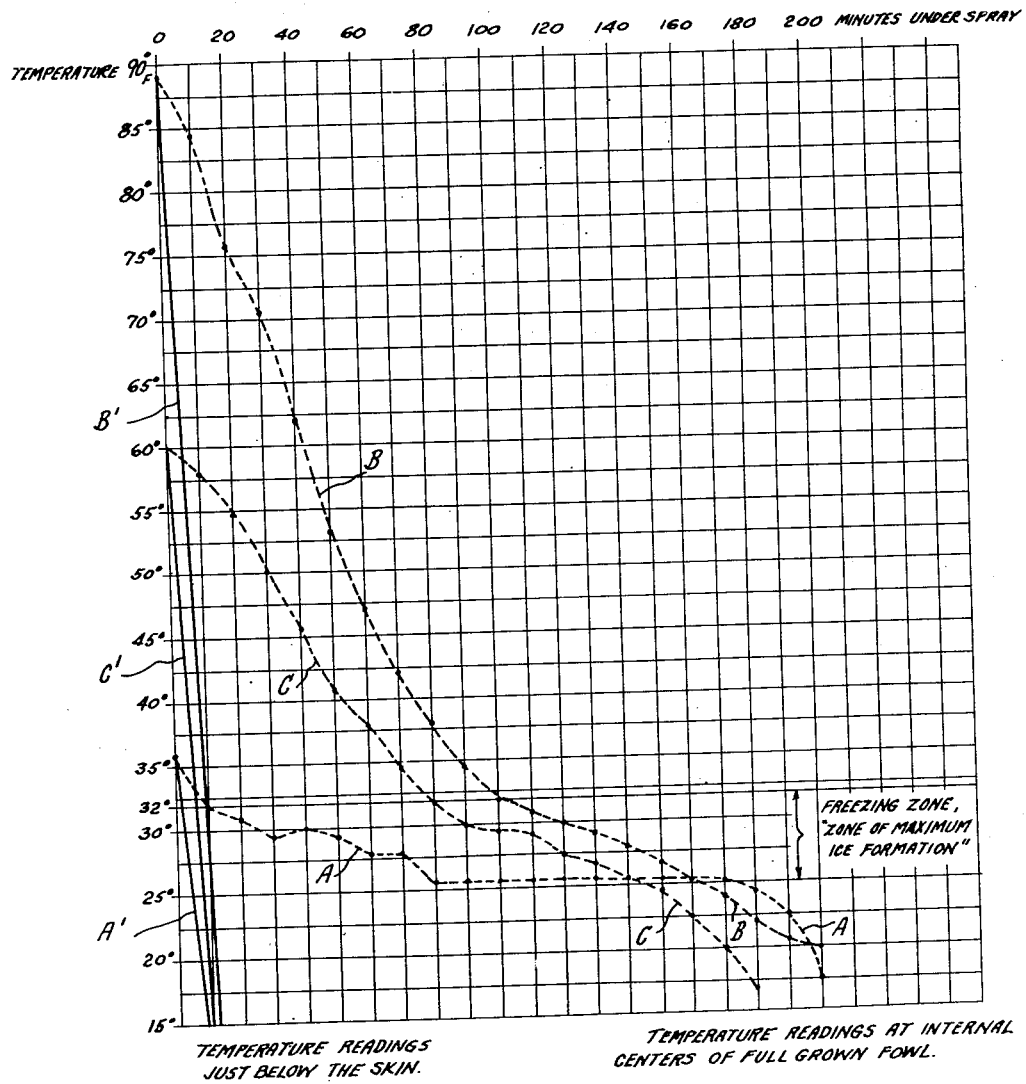

Patented Sept. 13, 1949

2,481,484

UNITED STATES PATENT OFFICE 2,481,484

QUICK-FREEZING OF FOODSTUFFS WITHOUT PRECOOLING

Harry A. Noyes, Watertown, Mass.

Application December 9, 1944, Serial No. 567,380

9 Claims. (Cl. 99—194)

The present invention relates to the preservation of poultry and other foodstuffs, by freezing. Within the meaning of the term "poultry" as here used I include birds of all classes, whether domestic fowls or game birds. A particular object has been to retain in frozen foodstuffs as fully as possible the natural characteristics of flavor and other qualities possessed by newly killed birds. More particularly, and with respect to poultry, the object has been to avoid the harm to flavor which is often termed "guttiness," noted in fowls frozen according to the prior practices, and to furnish frozen birds which, when cooked, have superior flavor.

The amount of poultry frozen each year is enormous and the methods followed in freezing most of it cannot be considered as quick freezing. It has been the general practice heretofore to retain the birds after killing for from at least one to several days at a low temperature, but a temperature higher than that of freezing, before freezing them. I have found that if birds are allowed to cool, and are then eviscerated, the harm to flavor called guttiness has already taken place. In my search for means to obviate this disagreeable flavor, I have discovered that when birds are subjected to the quick freezing procedure shortly after killing, that is, within about four hours, or as soon as the preliminary steps of bleeding and removal of feathers can be completed, there is practically no development of gutty flavor. As a general statement of my discoveries I may say that less morphological, cytological and other changes occurred in the foodstuffs when subjected to the quick freezing procedure while still warm than was the case when identical units of foodstuffs were cooled by subjection to low temperature, above the freezing point, before being frozen, even though the freezing was performed by a superior quick freezing operation.

The invention comprises subjecting birds while warm, that is, at a temperature near their living temperature and before they have lost much of their original heat, to the quick freezing procedure. As one example of the method in which the invention consists, warm birds are supported on a belt and subjected to brine (sodium chloride solution) sprayed or poured over them in large volume at a temperature at least 15° Fahrenheit below the freezing point of the birds; i. e., the temperature of the freezing solution is 15° Fahrenheit or lower. This procedure results in completely freezing the birds within generally about six hours or less after killing. This invention was first described in my copending application Ser. No. 306,820, filed Nov. 30, 1939, (pursuant to which Patent No. 2,374,452 was granted April 24, 1945) of which the present application is a continuation in part.

It is customary to consider that there are three distinct phases of heat extraction from foodstuffs when subjected to freezing. The first phase is that where the foodstuff is cooled throughout to its freezing point, during which the lowering of temperature each degree involves the extraction of the number of thermal units per unit of weight that is numerically represented by the specific heat of the foodstuff. The second phase is the freezing, the extraction of latent heat of solidification which takes place while the temperature remains at the freezing point. The third phase is the lowering of the temperature of the frozen foodstuff, during which the loss of heat is represented by the specific heat of the frozen substance. In the published scientific texts and the freezing art as heretofore practised, the length of time required for the foodstuff to pass through the second phase is a considerable portion of the length of time during which the foodstuff is subjected to the freezing operation. In warehouses where the temperature is maintained at zero F. and the foodstuffs are simply placed therein, this time is generally twenty four hours or more for average weight fowls. This character of freezing is not quick freezing. An extensively used definition of quick freezing is to the effect that a food article is quick frozen when a layer approximately two inches thick has passed through the temperature zone of maximum ice formation, (that in which the latent heat of freezing is extracted) in a period of time not exceeding approximately two hours.

In my procedure as hereinbefore described, a new character of freezing takes place in that the three phases of heat extraction take place almost as a single continuous phase with little change of rate of temperature reduction throughout the entire range, and with simultaneous occurrence of all three phases during a major portion of the time when freezing takes place. As illustrating this fact, reference is made to the accompanying drawing which shows on a chart of time and temperature the rates of cooling and freezing of birds frozen in accordance with the prior commercial practice and the present invention, respectively. In this chart the ordinates designate temperatures from 90° F. to 15° F., the latter being approximately that of the refrigerant solution to which the birds were subjected, and the abscissae represent minutes of elapsed time during which the birds were continuously subjected to a heavy spray of the refrigerant solution. The birds from which these data were taken were full grown fowls of the same heredity, age and weight, which had been fed with the same food in the same way. Temperature readings were taken at ten minute intervals from two thermometers, one of which was inserted just under the skin of the fowl and the other in the center of the body.

One of the birds under observation had been precooled according to the usual extended cooling out period and its temperature when subjected to the refrigerant spray was 36°, both at the center and under the skin. The broken line A on the chart presents the readings of temperature at the center of that bird and the solid line A' gives the readings under and close to the skin. The temperature at the center dropped 4° in ten minutes to 32°, and thereafter then slowly diminished during the next seventy minutes to a temperature of about 26°, and remained substantially at the same temperature for the following ninety minutes, when it again commenced to drop, and the lowering of temperature then continued at a substantially uniform rate until it approached the temperature of the refrigerant. The temperature zone between the water freezing point of 32° and the temperature of 25°, at which the first pronounced temperature drop was noted, has been designated as the freezing zone, or zone of maximum ice formation. The observations here recorded show that it required about one hundred seventy five minutes, or nearly three hours, for the precooled bird to be frozen all the way to the center. During most of that time there was no change of temperature at the center of the bird. The skin, however, being thin, lost heat rapidly and at a substantially uniform rate before, during, and after freezing, and it acquired the temperature of the freezing solution in about eight minutes.

The second specimen, being as nearly identical with the first as like heredity, age and feeding could make it, was put under the spray as soon as it had been defeathered and when it had lost only enough heat to bring its body temperature to 89°. The broken line B on the chart shows the change of center temperature of this specimen and the solid line B' the change of temperature just below the skin. Its center temperature then dropped in the course of one hundred minutes to the freezing point, and passed through the zone of maximum ice formation in the next sixty five minutes. Its skin cooled, froze and attained the temperature of the solution at a substantially uniform rate in twelve minutes.

A third specimen, as nearly like the other two as possible, was allowed to cool gradually to a temperature of 60° before being subjected to the refrigerant spray. The successive center temperatures and subcutaneous temperatures of the third specimen are shown on the chart by the broken line C and the solid line C', respectively. In this bird the center temperature reached the freezing point in eighty minutes and passed through the zone of maximum ice formation in sixty five minutes more. Its skin was frozen and brought to the temperature of the refrigerant at a substantially uniform rate in ten minutes.

In all these tests, the temperature, concentration and rate of application of the refrigerant solution were the same. Both the second and third specimens here described are considered as warm, as compared with the first specimen, and neither had been killed more than four hours before being subjected to the freezing procedure. Both froze throughout in considerably less than half the time required for freezing the precooled bird to solidity. In the case of the warm birds, the successive increments of depth from the skin inward are almost instantly frozen when brought to the freezing zone of temperature, wherefore the temperature gradient of the center of the body in the freezing zone somewhat nearly approaches in steepness the gradient below that zone after the bodies have been frozen solid; while with precooled birds the center temperature remains nearly the same until the freezing is complete, when it drops sharply. An initial temperature of 55° is about the lowest temperature to which a fowl can be brought prior to subjection to the freezing step in order to obtain the character of quick freezing here described.

I have found by a multitude of tests that poultry thus frozen within a few hours of slaughtering and without prolonged cooling out has none of the unpleasant flavor known as guttiness which precooled birds frequently have, and that this early freezing procedure is a sure preventive of such impairment of flavor.

What I claim and desire to secure by Letters Patent is:

1. A process of handling poultry by quick freezing with substantially complete retention of natural unimpaired constitution and flavor of the flesh as it existed at the time bleeding ceased in the slaughtering step, comprising killing, bleeding and defeathering the bird in rapid succession and then before any appreciable physiological changes other than of temperature have occurred subjecting substantially the entire surface of the carcass to intimate thermal contact with a copious spray of liquid refrigerant, containing sodium chloride as the principal solute, flowed over the naked carcass, maintaining the solution at a temperature low enough below the freezing point of water containing portion of the carcass in a quick freezing process to produce quick freezing and causing the solution to pass continuously over the surfaces of the carcass for a period of time, sufficient to effect quick freezing of said carcass.

2. A process of handling poultry with substantially complete retention of the natural unimpaired constitution and flavor of the flesh as it existed at the time the bleeding ceased in the slaughtering step, comprising killing, bleeding and defeathering the bird in rapid succession and then before any appreciable physiological changes other than of temperature have occurred, specifically before the temperature throughout has lowered below approximately 90 degrees F. and the time elapsed after killing is not in excess of approximately one and a half hours, subjecting substantially the entire surface of the carcass to intimate thermal contact with a continuous copious spray of liquid refrigerant, containing sodium chloride as the principal solute, maintained at a temperature below the freezing point of the water containing portion of the carcass in a quick freezing process and continuing the passing of such spray over the surface of the carcass for a period of time sufficient to substantially quick freeze said carcass.

3. A process of handling poultry with substantially complete retention of natural unimpaired constitution and flavor of the flesh as it existed at the time bleeding ceased in the slaughtering step, comprising killing, bleeding and defeathering the carcass in rapid succession and then before any appreciable physiological change other than of temperature has occurred and before its average temperature has lowered below approximately 80 degrees F. and during an elapsed period of not over approximately two hours after killing, subjecting substantially the entire surface of the carcass to intimate thermal contact with a constantly renewed copious spray of a liquid refrigerant, containing sodium chloride as the principal solute, maintaining the spray at a temperature below the freezing point of the water containing portion of the carcass and continuously passing the spray over the surface of the carcass for a period of time sufficient to preserve said carcass when placed in a zero temperature cold storage room.

4. A process of handling poultry with substantially complete retention of natural unimpaired constitution and flavor of the flesh as it existed at the time bleeding ceased in the slaughtering step, comprising killing, bleeding and defeathering a bird in rapid succession and then before any appreciable physiological changes other than of temperature have occurred and before the average temperature of the carcass has lowered to approximately 70 degrees F. and within a period of approximately two hours after killing, subjecting substantially the entire surface of the carcass to intimate thermal contact with a constantly renewed copious spray of liquid refrigerant, containing sodium chloride as the principal solute, maintained at a temperature enough lower than the freezing point of the water containing portion of the carcass to produce quick freezing and for a length of time sufficient to substantially freeze said carcass.

5. A process of handling poultry with substantially complete retention of natural unimpaired constitution and flavor of the flesh, comprising killing, bleeding and defeathering a bird in rapid succession and then before the temperature has been lowered to approximately 60 degrees F. and within a period of not over approximately two hours from the time of killing, subjecting substantially the entire surface of the carcass to intimate thermal contact with a copious spray of liquid refrigerant, containing sodium chloride as the principal solute, maintained at a temperature low enough below the freezing point of the water containing portion of the carcass for quick freezing and continuing the application of said liquid refrigerant until the carcass is frozen.

6. A process of handling poultry with substantially complete retention of natural unimpaired flavor of the flesh as it was at the time bleeding ceased in the slaughtering step, comprising in rapid succession killing, bleeding and defeathering a bird and then before any appreciable physiological changes other than of temperature have occurred, and within a period of time not over approximately two hours after killing, subjecting substantially the entire surface of the carcass to heat extraction by a spray, consisting principally of sodium chloride in water with the salt content sufficient to maintain the solution in liquid state at the temperature used for the quick freezing, copiously and continuously applied to the naked carcass; said solution being maintained at a temperature low enough below the freezing point of the water containing portions of the carcass to produce quick freezing and applied for a period of time long enough to produce a quick freezing of the carcass in which the three steps of heat extraction, namely, lowering to the freezing temperature, extracting the latent heat of freezing and lowering the temperature of frozen freezable parts of the carcass are all going on simultaneously during the major portion of the time that it takes to quick freeze the carcass.

7. A process of handling poultry by solidifying the same with substantially complete retention of natural unimpaired flavor of the flesh as it was at the time bleeding ceased in the slaughtering step, comprising in rapid succession killing, bleeding and defeathering the carcass and then before any appreciable physiological changes other than of temperature have occurred in the edible portion, specifically before the carcass temperature has lowered below approximately 80 degrees F. and before a period of time of over approximately one and a half hours after killing has elapsed, subjecting the carcass to heat extraction through substantially its entire surface by spraying thereon copiously and continuously a refrigerant solution consisting principally of sodium chloride and water in which the salt content is at least sufficient to maintain the solution liquid at the temperature, not over 15 degrees F. employed for the quick freezing, for a time long enough to effect a quick freezing of the carcass in which the three steps of heat extraction, namely, lowering the temperature to the freezing point, extracting the latent heat of freezing and lowering the temperature of frozen freezable parts of the carcass, are all going on simultaneously during the major portion of the time that it takes to quick freeze the carcass.

8. A process of handling poultry by solidifying the same with substantially complete retention of natural unimpaired flavor of the flesh as it was at the time bleeding ceased in the slaughtering step, comprising in rapid succession killing, bleeding and defeathering a bird and then before any appreciable physiological changes other than of temperature have occurred in the edible portions of the carcass, specifically before its temperature has lowered below approximately 70 degrees F. and within approximately two hours after bleeding, subjecting the carcass to heat extraction by a refrigerant spray, consisting principally of sodium chloride in water solution with the salt content at least sufficient to maintain the solution liquid at whatever temperature, not over 15 degrees F., is employed for quick freezing, and causing such solution to flow copiously and continuously over substantially the entire naked carcass at a temperature low enough below the quick freezing temperature of the carcass; for a time long enough to effect quick freezing of the carcass with simultaneous occurrence of the three steps of heat extraction, namely, lowering the temperature to the freezing point, extracting the latent heat of freezing and lowering the temperature of frozen freezable parts of the carcass during the major portion of the time that it takes to quick freeze the carcass.

9. A process of handling poultry with substantially complete retention of natural unimpaired flavor of the flesh, comprising in rapid succession killing, bleeding and defeathering a bird and then before any appreciable physiological changes other than of temperature have occurred applying to the entire surface of the carcass a refrigerant solution, containing sodium chloride as the principal solute, copiously and continuously, at temperatures low enough below the freezing point of the water containing portions of the carcass to quick freeze the same, for a period of time long enough to produce quick freezing with simultaneous occurrence of the three steps of heat extraction concerned, namely, lowering to the freezing temperature, extracting the latent heat of freezing and lowering the temperature of quick frozen parts of the carcass during the major portion of the time required to freeze the carcass throughout.

HARRY A. NOYES.

REFERENCES CITED

The following references are of record in the file of this patent:

Ice and Refrigeration, July 1936, pages 51 to 57.
The National Provisioner, May 29, 1937, pages 15, 23, and 25.